Patented May 26, 1936

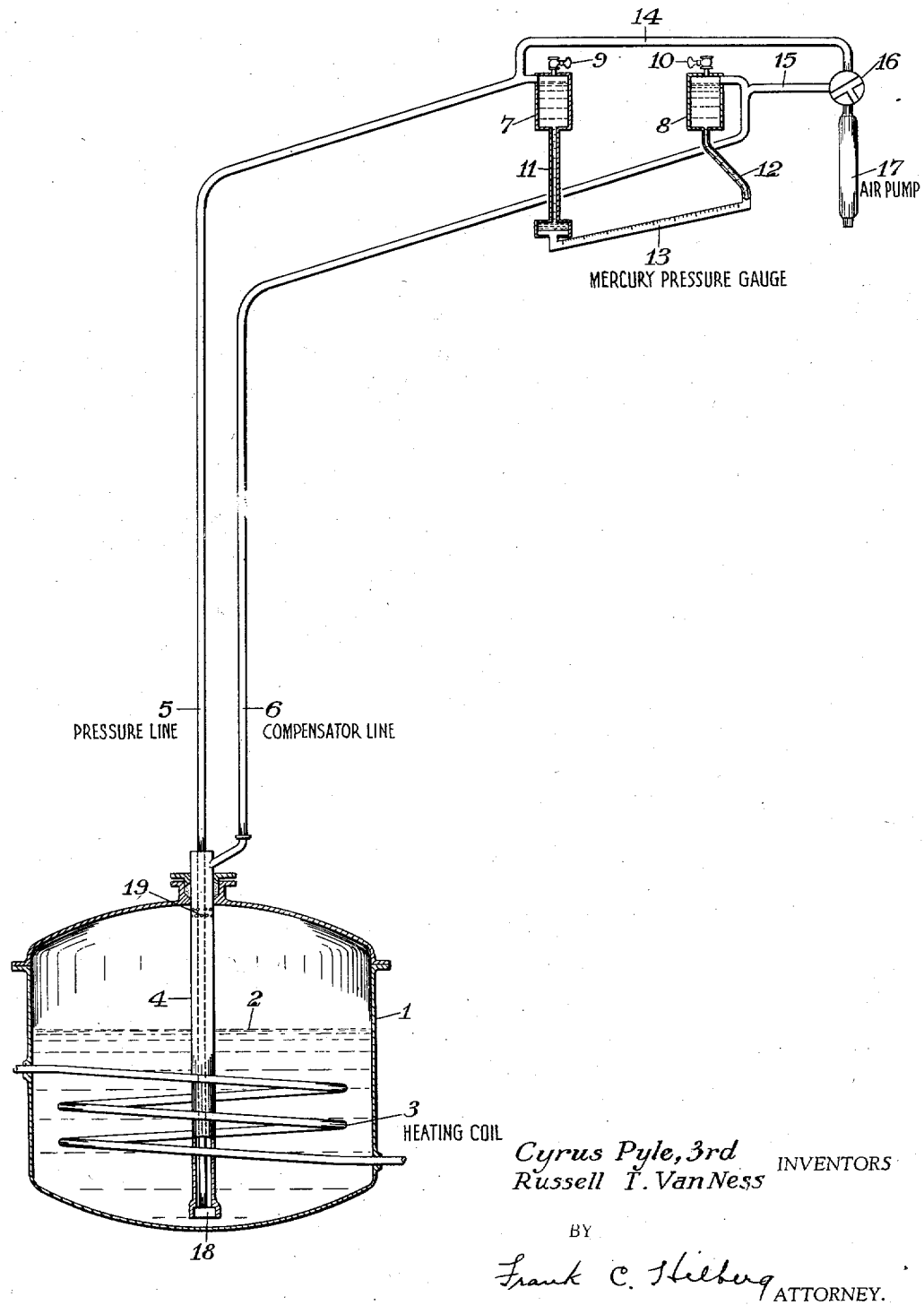

2,041,859

UNITED STATES PATENT OFFICE 2,041,859

LIQUID LEVEL INDICATOR

Cyrus Pyle, 3d, Parlin, and Russell Terry Van Ness, Metuchen, N. J., assignors to E. I. du Pont de Nemours & Company, Wilmington, Del., a corporation of Delaware Application September 14, 1934, Serial No. 743,958

1 Claim. (Cl. 73—54)

This invention relates to apparatus for indicating the level of a liquid within a vessel and more particularly to a gauge for indicating the level of a boiling liquid under normal or abnormal atmospheric pressure of its own vapor.

Hydrostatic pressure gauges are commonly used for indicating the level of liquids in tanks, boilers, or other vessels, for example, the well-known glass boiler gauge. These gauges are usually satisfactory where they may be installed in a position close to the tank which confines the boiling liquid. Such gauges may also be connected by air-tight pipes if the level indicator is situated at a distance from the tank but gauges are usually unsatisfactory where the liquid is boiling, particularly if boiling violently, because the vapors produced by the boiling liquid condense in the pipes wherever a pocket is formed, or even in the sight glass, and therefore cause a false reading. The boiling liquid often dilutes the indicating liquid of the gauge, yielding incorrect readings.

The object of this invention is to provide an instrument which will indicate the correct level of a confined boiling liquid. A further object is to provide an instrument which will indicate the correct level of a boiling liquid at a distance from the vessel in which the liquid is boiling.

These objects are accomplished by introducing liquid overflow traps at equal levels above the two legs of a manometer gauge at the highest point of the system.

The drawing shows diagrammatically the general plan of a suitable form of apparatus. In the drawing, 1 is a vessel which contains a boiling liquid indicated as 2. Near the bottom of the vessel and immersed in the liquid is a heating coil 3, which may be either a steam coil or an electrical heating unit. The vessel 1 is provided with a well 4, which is open at the bottom and closed at the top. Two pipes, 5 and 6, lead from the tube 4 to reservoirs 7 and 8, respectively, at the highest point in the system. These reservoirs are provided with two overflow cocks, 9 and 10. Pipes 11 and 12 lead from the base of the reservoirs 7 and 8, to the lower and upper ends respectively of a manometer tube 13 containing mercury. Two pipes, 14 and 15, lead from the reservoirs 7 and 8, to a three-way valve 16 which is connected with an air pump 17. Pipe 5 enters the well 4 and extends downwardly to the bottom of the liquid confined in the vessel 1 where it enlarges into a bell indicated as 18.

The apparatus is prepared for operation by filling the reservoirs 7 and 8 with the same liquid as that contained in the vessel 1 until these reservoirs are filled and overflow through the valves 9 and 10, which are then closed.

In the operation of the apparatus to determine the level of a boiling liquid, indicated as 2, air is blown from the pump 17 through the valve 16 and pipe 15 through pipe 6 into the well 4 and out small holes indicated as 19 in the upper part of the well. The valve 16 is then turned to cut off the air flowing in pipe 15 and adjusted to allow air to flow through pipes 14 and 5 and out the bell 18. The purpose of this flow of air through these pipes is to sweep out all vapors of the boiling liquid. When this is done the valve 16 is closed. It is obvious that the surface of the mercury in gauge 13 will now indicate the differential pressure between the bottom and the surface of liquid 2 in the vessel 1. This manometer 13 may be suitably calibrated so that the level of the liquid tube can be read thoroughly from the calibrated chart.

Liquid formed by the condensation of the vapors from the boiling liquid can have no effect on the manometer reading, since the reservoirs 7 and 8 are already filled to overflowing with the same liquid, and any excess will flow back through the pipes 5 and 6 without having any influence on the reading of the manometer. It is apparent that the apparatus may be used for distillations carried out under sub or super atmospheric pressure as well as normal atmospheric pressure.

The apparatus may be placed in a position close to or remote from the vessel containing the boiling liquid. Other modifications will be apparent to those skilled in the art of using such devices without departing from the spirit of the invention.

This invention is of particular use in measuring the level of boiling liquids in closed vessels and is applicable to the distillation of organic liquids, for example, alcohols, ketones and ethers, petroleum products such as gasoline, kerosene; coal tar products such as benzene, toluene; and in carrying out reactions requiring refluxing such as the formation of esters. It is also applicable to evaporation processes, for example, the removal of water prior to the crystallization of inorganic salts, acids or bases.

This invention has an advantage over other devices for indicating the level of liquids by the fact that it can be used for determining both boiling and non-boiling liquids in a closed vessel with exceptional accuracy where the heretofore known devices would be entirely unsuitable.

It is apparent that many widely different embodiments of this invention may be made without departing from the spirit and scope thereof and, therefore, it is not intended to be limited except as indicated in the appended claim.

We claim:

An apparatus for determining the level of a boiling liquid, comprising a vessel adapted to contain a boiling liquid under low super-atmospheric pressures and equipped with a V-tube liquid level gauge, a reservoir at the highest point in each leg of the gauge, a pipe communicating with the reservoir in one leg of the gauge and the lower part of the interior of said vessel, a second pipe communicating with the reservoir in the other leg of the gauge and the space above the liquid in said vessel, and an air pump communicating with each of said pipes whereby the said pipes are maintained free of liquid.

CYRUS PYLE, 3RD.
RUSSELL TERRY VAN NESS.

CERTIFICATE OF CORRECTION.

Patent No. 2,041,859.           May 26, 1936.

CYRUS PYLE, ET AL.

It is hereby certified that error appears in the printed specification of the above numbered patent requiring correction as follows: Page 2, first column, line 9, in the claim, for "V-tube" read U-tube; and that the said Letters Patent should be read with this correction therein that the same may conform to the record of the case in the Patent Office.

Signed and sealed this 1st day of September, A. D. 1936.

(Seal)

Leslie Frazer
Acting Commissioner of Patents.

bodiments of this invention may be made without departing from the spirit and scope thereof and, therefore, it is not intended to be limited except as indicated in the appended claim.

We claim:

An apparatus for determining the level of a boiling liquid, comprising a vessel adapted to contain a boiling liquid under low super-atmospheric pressures and equipped with a V-tube liquid level gauge, a reservoir at the highest point in each leg of the gauge, a pipe communicating with the reservoir in one leg of the gauge and the lower part of the interior of said vessel, a second pipe communicating with the reservoir in the other leg of the gauge and the space above the liquid in said vessel, and an air pump communicating with each of said pipes whereby the said pipes are maintained free of liquid.

CYRUS PYLE, 3RD.
RUSSELL TERRY VAN NESS.

CERTIFICATE OF CORRECTION.

Patent No. 2,041,859.                                   May 26, 1936.

CYRUS PYLE, ET AL.

It is hereby certified that error appears in the printed specification of the above numbered patent requiring correction as follows: Page 2, first column, line 9, in the claim, for "V-tube" read U-tube; and that the said Letters Patent should be read with this correction therein that the same may conform to the record of the case in the Patent Office.

Signed and sealed this 1st day of September, A. D. 1936.

(Seal)

Leslie Frazer
Acting Commissioner of Patents.

CERTIFICATE OF CORRECTION.

Patent No. 2,041,859.

May 26, 1936.

CYRUS PYLE, ET AL.

It is hereby certified that error appears in the printed specification of the above numbered patent requiring correction as follows: Page 2, first column, line 9, in the claim, for "V-tube" read U-tube; and that the said Letters Patent should be read with this correction therein that the same may conform to the record of the case in the Patent Office.

Signed and sealed this 1st day of September, A. D. 1936.

(Seal)

Leslie Frazer
Acting Commissioner of Patents.